US006748875B2

(12) United States Patent
Duley

(10) Patent No.: US 6,748,875 B2
(45) Date of Patent: Jun. 15, 2004

(54) WIRELESS EQUIPMENT SKID SYSTEM

(75) Inventor: Wayne C. Duley, Kents Store, VA (US)

(73) Assignee: Shebandoah Tower Service, Ltd., Staunton, VA (US)

( * ) Notice: Subject to any disclaimer, the term of this patent is extended or adjusted under 35 U.S.C. 154(b) by 0 days.

(21) Appl. No.: 10/175,434

(22) Filed: Jun. 19, 2002

(65) Prior Publication Data

US 2003/0000433 A1 Jan. 2, 2003

Related U.S. Application Data

(60) Provisional application No. 60/299,356, filed on Jun. 19, 2001.

(51) Int. Cl.[7] ............................................... B65D 19/00
(52) U.S. Cl. .................................................. 108/51.1
(58) Field of Search ........................... 108/51.11, 55.1, 108/55.3, 54.1; 206/386, 600, 576; 312/265.5, 263

(56) References Cited

U.S. PATENT DOCUMENTS

| | | | | |
|---|---|---|---|---|
| 1,317,550 A | * | 9/1919 | Cass ............................ | 108/27 |
| 4,978,014 A | * | 12/1990 | Humitz et al. ................ | 211/195 |
| 5,505,140 A | * | 4/1996 | Wittmann ..................... | 108/51.11 |
| 5,706,738 A | * | 1/1998 | Rapeli ........................... | 108/54.1 |
| 5,842,424 A | * | 12/1998 | Prevot et al. ................ | 108/54.1 |
| 6,003,449 A | * | 12/1999 | Manidis ........................ | 108/54.1 |
| 6,035,790 A | * | 3/2000 | Polando ........................ | 108/55.1 |
| 6,105,511 A | * | 8/2000 | Bridges ........................ | 108/55.3 |

FOREIGN PATENT DOCUMENTS

DE          4307340       *  9/1994

* cited by examiner

*Primary Examiner*—Jose V. Chen
(74) *Attorney, Agent, or Firm*—Williams Mullen, PC; Thomas F. Bergert; Hillary W. Hawkins

(57) ABSTRACT

The disclosure defines a wireless equipment skid comprising a base member having a top, a bottom, a front end and a rear end; an upright member; an extension member and a center panel located on the top of the base member. The base member is generally in a horizontal position, and the upright member is perpendicular to the base member. The extension member is parallel with the base member. The upright member is attached to the rear end of the base member and the extension member is attached to the front end. A pathway from the extension member to the upright member runs along the bottom of the base. The upright member houses a wireless communication device, the extension member houses a battery cabinet and the pathway houses a wiring system.

10 Claims, 4 Drawing Sheets

WIRELESS EQUIPMENT SKID SYSTEM

CROSS REFERENCE TO RELATED APPLICATION

This application claims the benefit of U.S. Provisional Application No. 60/299,356 filed in the United States Patent Office on Jun. 19, 2001.

FIELD OF INVENTION

This invention relates generally to a skid system. More particularly, this invention relates to a wireless equipment skid system.

BACKGROUND OF THE INVENTION

Skids are well known in the art and have been used historically for transporting and supporting various articles. Standard skids made of wood or cardboard are described in U.S. Pat. Nos. 3,204,583; 3,294,041; 3,430,585,3,641,948 and 4,230,050. U.S. Pat. No. 3,405,666 describes a skid made from plastic. U.S. Pat. No. 6,058,852 describes a heavy equipment skid.

In the past, wireless communication equipment required a foundation system for installation. Previous installation systems did not have the ability to integrate prefabricated or temporary wireless equipment installations.

There exists a need for a skid system for use in conjunction with wireless communication equipment. Heretofore this system has not been found in the art. Accordingly, the present invention is a novel skid system that eliminates the need for foundation installation. Furthermore, the present invention permits the prefabrication of equipment installation packages, thereby expediting installations.

SUMMARY OF THE INVENTION

This invention provides for the prefabrication of wireless communications equipment assemblies to be used in permanent or temporary sites, while eliminating the requirement for a cast-in-place foundation.

The invention comprises a steel frame skid fabricated to dimensions matching the requirements of the equipment. The pre-existing equipment is fitted to the skid, which is wired to accommodate the equipment. The prefabricated assembly is then transported to its permanent location. This novel skid facilitates modular wireless equipment installation.

This invention is ideal for fast-paced installation schedules and temporary installations. It provides the user the ability to pre-fabricate installations, coupled with the ability to relocate equipment in a cost efficient manner. It also eliminates the need for of a concrete foundation.

BRIEF DESCRIPTION OF THE DRAWINGS

FIG. 1 shows a front view of the skid;

FIG. 2 shows a perspective view of the skid;

FIG. 3 shows a side view of the skid, including equipment; and

FIG. 4 shows a side view of the base, with top removed to show wiring system.

DETAILED DESCRIPTION

Figure 1:
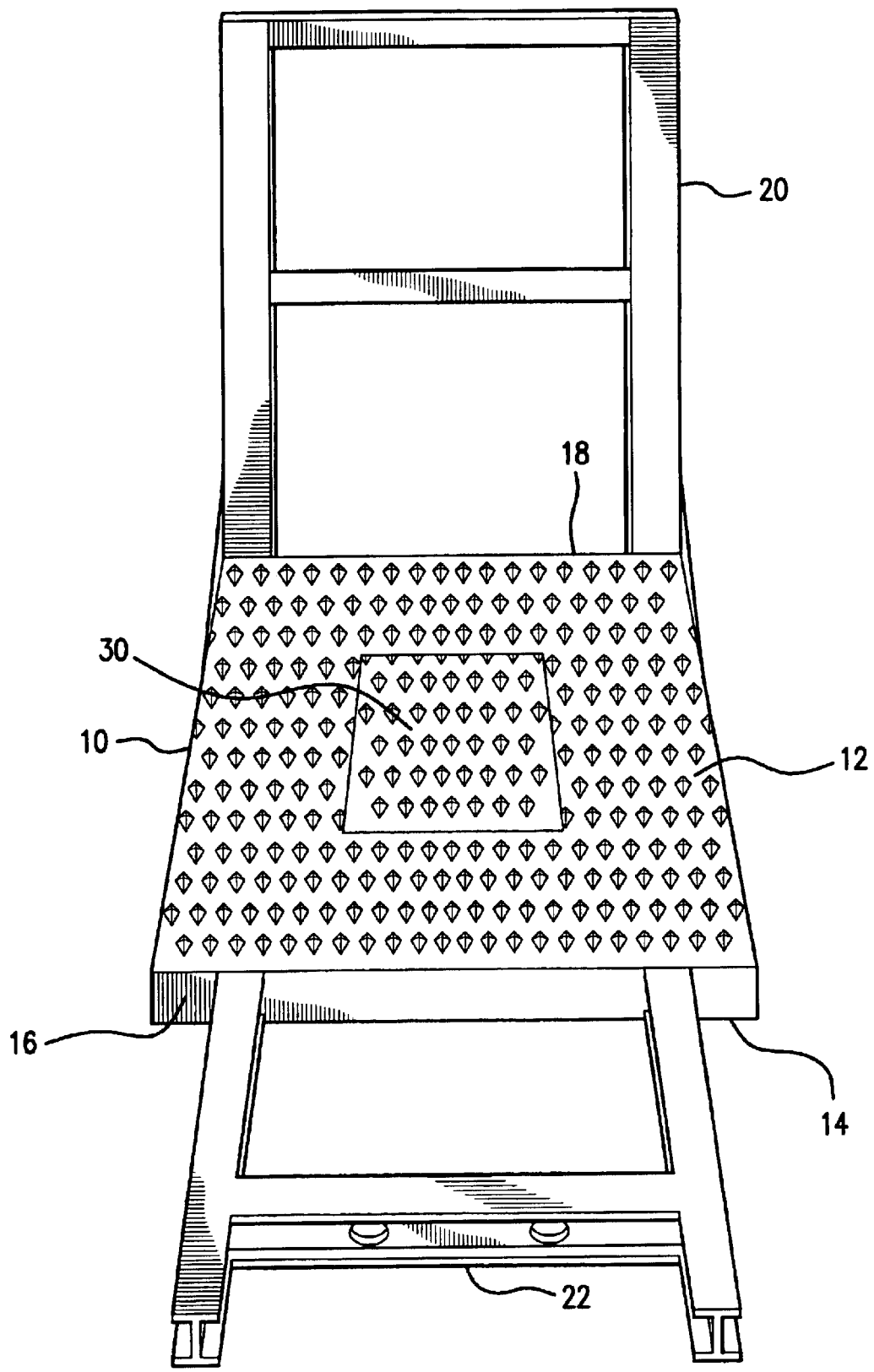
FIGS. 1–4 display various aspect of the skid.
Figure 2:
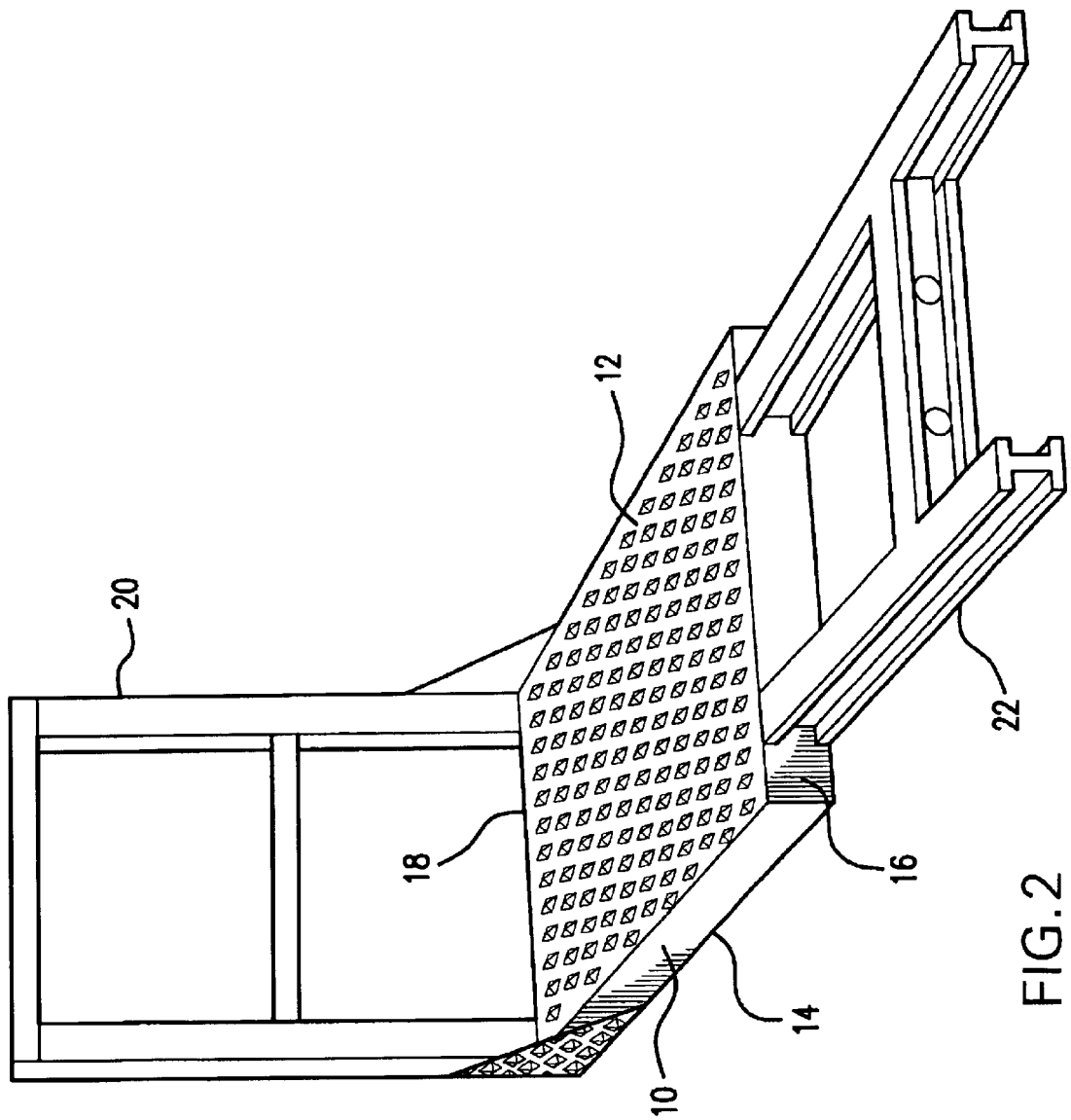

Referring to FIGS. 1 and 2, the present invention is a wireless equipment skid comprising a base member (10) having a top (12), a bottom (14), a front end (16) and a rear end (18); an upright member (20); an extension member (22) and a removeable center panel (30) located on the top (12) of the base member (10). The base member (10) is generally in a horizontal position, and the upright member (20) is perpendicular to the base member (10). The extension member (22) is parallel with the base member (10). The upright member (20) is attached to the rear end (18) of the base member and the extension member (22) is attached to the front end (16). A pathway (34) from the extension member (22) to the upright member (20) exists along the bottom (14) of the base.

Figure 3:
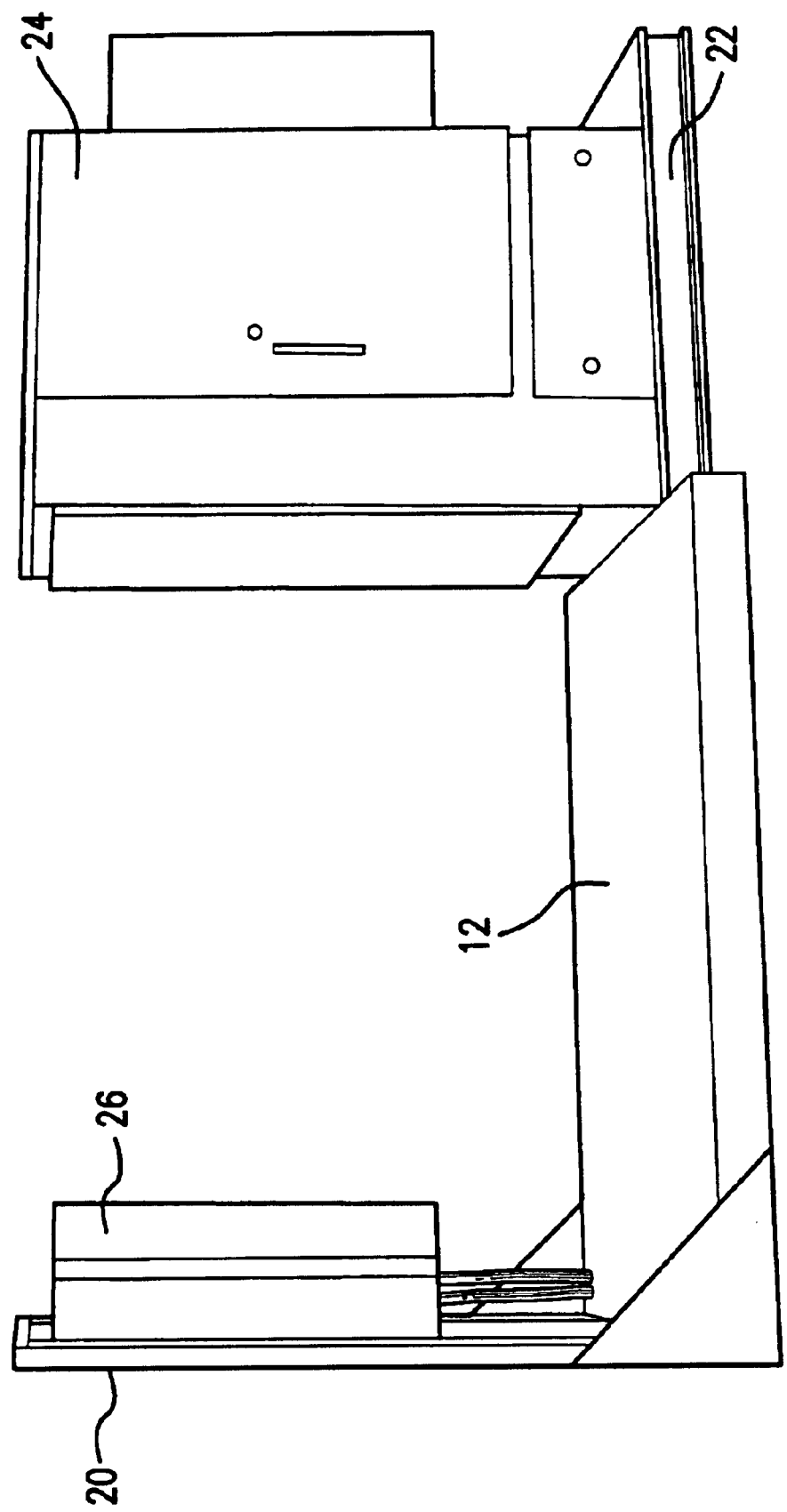
Figure 4:
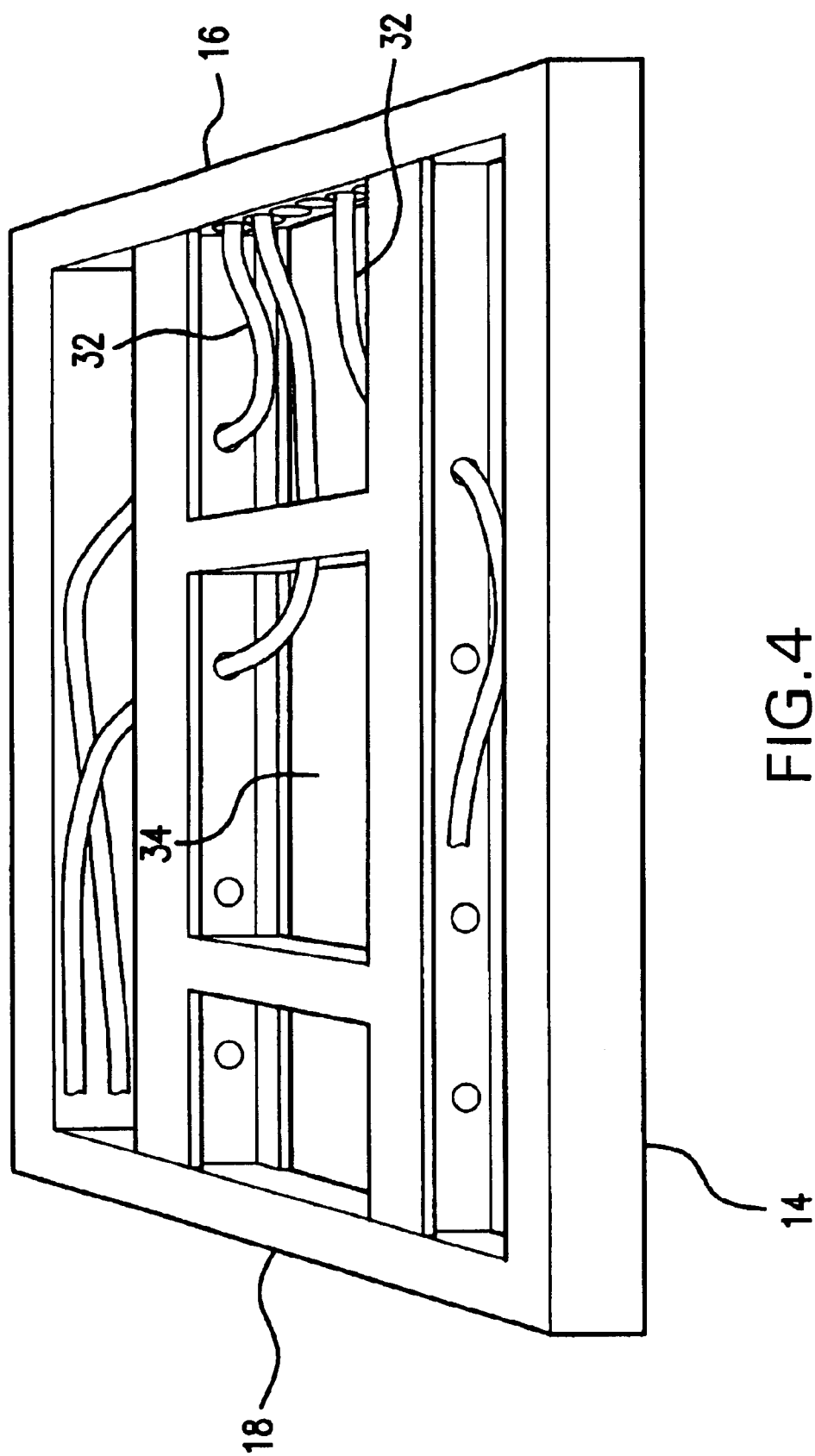

In a preferred embodiment, the base member (10) is a rectangular shape and the skid is made out of an epoxy-coated or galvanized tube steel fabricate frame. Referring to FIG. 3, the upright member (20) houses a wireless communication cabinet (26) and the extension member (22) houses a power supply cabinet (24). Said power supply may be a battery. Said extension member (22) may contain a gasket for attaching the cabinet. Referring to FIG. 4, a wiring system (32) exists along the bottom (14) of the base, through the pathway (34). The center panel (30) may be removed to access the wiring system (32). Said wiring system (32) is connected from the battery cabinet (24) to the wireless communication cabinet (26). Both AC and DC power and telco are provided for. The top (12) of the frame may be covered with diamond checkerplate. The diamond checkerplate can be ⅜ inch with a textured and non-stick surface.

In a one embodiment, the wireless communication cabinet (26) may be the Motorola® SC 611. The SC 611 is a digtial cellular base transceiver station which includes a compact and self-contained unit that can be wall, pole, ceiling or rack mounted. The base station is small in size, light in weight and produces zero noise emissions, thus facilitating a modular installation.

Many improvements, modifications, and additions will be apparent to the skilled artisan without departing from the spirit and scope of the present invention as described herein.

I claim:

1. A wireless equipment skid comprising:
   a. a base member having a top, a bottom, a front end and a rear end, said base being in a generally horizontal position;
   b. an upright member attached to the rear end and perpendicular to the base member;
   c. an extension member attached to the front end and parallel with the base member, said bottom, front end and rear end of said base member forming a pathway from the extension member to the upright member;
   d. a center panel removably positioned on the top of the base member so as to cover said pathway.

2. The skid of claim 1 wherein said skid is made of steel.

3. The skid of claim 2 wherein said steel is galvanized or epoxy-coated.

4. The skid of claim 1 wherein said upright member houses a wireless communication cabinet.

5. The skid of claim 1 wherein said extension member houses a power supply cabinet.

6. The skid of claim 5 wherein said power supply cabinet is a battery cabinet.

7. The skid of claim 1 wherein a wiring system passes through said pathway.

8. The skid of claim 7 wherein said wiring system may be accessed by removing said center panel.

9. A wireless equipment skid comprising:
   a. a base member having a top, a bottom, a front end and a rear end, said base being in a generally horizontal position;
   b. an upright member attached to the rear end and perpendicular to the base member;

c. an extension member attached to the front end and parallel with the base member, said bottom, front end and rear end of said base member forming a pathway from the extension member to the upright member;

d. a center panel removably positioned on the top of the base member so as to cover said pathway;

wherein said upright member houses a wireless communication cabinet, said extension member houses a battery cabinet, and a wiring system passes through said pathway.

10. The skid of claim 9 wherein said wiring system is connected from the battery cabinet to the wireless communication cabinet through the pathway and may be accessed by removing the center panel.

* * * * *